(12) United States Patent
Kadowaki et al.

(10) Patent No.: US 9,964,173 B2
(45) Date of Patent: May 8, 2018

(54) ANTIVIBRATION DEVICE

(71) Applicants: YAMASHITA RUBBER CO., LTD., Fujimino, Saitama (JP); HONDA MOTOR CO., LTD., Tokyo (JP)

(72) Inventors: Hirokazu Kadowaki, Saitama (JP); Keisuke Kawabe, Saitama (JP)

(73) Assignees: YAMASHITA RUBBER CO., LTD., Fujimino (JP); HONDA MOTOR CO., LTD., Tokyo (JP)

( * ) Notice: Subject to any disclaimer, the term of this patent is extended or adjusted under 35 U.S.C. 154(b) by 0 days. days.

(21) Appl. No.: 15/379,700

(22) Filed: Dec. 15, 2016

(65) Prior Publication Data

US 2017/0175844 A1    Jun. 22, 2017

(30) Foreign Application Priority Data

Dec. 16, 2015 (JP) ................. 2015-244767

(51) Int. Cl.

| | |
|---|---|
| *F16F 13/10* | (2006.01) |
| *B60G 15/06* | (2006.01) |
| *B60K 5/12* | (2006.01) |
| *F16F 15/02* | (2006.01) |
| *B60G 7/02* | (2006.01) |
| *B60G 13/16* | (2006.01) |

(52) U.S. Cl.
CPC ............... *F16F 13/10* (2013.01); *B60G 7/02* (2013.01); *B60G 13/16* (2013.01); *B60G 15/06* (2013.01); *B60K 5/1208* (2013.01); *F16F 15/022* (2013.01); *B60G 2202/24* (2013.01); *B60G 2202/25* (2013.01); *B60G 2204/41* (2013.01); *B60G 2204/41062* (2013.01); *B60G 2500/10* (2013.01); *F16F 2224/025* (2013.01); *F16F 2238/04* (2013.01)

(58) Field of Classification Search
CPC .. B60G 15/06; B60G 2202/24; B60K 5/1208; F16F 13/10; F16F 15/022; F16F 2224/025; F16F 2238/04
See application file for complete search history.

(56) References Cited

U.S. PATENT DOCUMENTS

| | | | | |
|---|---|---|---|---|
| 4,763,884 A | * | 8/1988 | Matsui ................ | F16F 13/14 267/121 |
| 4,971,456 A | * | 11/1990 | Hori .................... | B60K 17/24 267/140.12 |
| 5,887,844 A | * | 3/1999 | Fujiwara ............ | F16F 13/14 267/140.11 |
| 9,377,078 B2 | * | 6/2016 | Kadowaki .......... | F16F 13/1463 |
| 2002/0145240 A1 | * | 10/2002 | Satori ................ | F16F 13/108 267/140.13 |

FOREIGN PATENT DOCUMENTS

JP    7-167198    7/1995

* cited by examiner

*Primary Examiner* — Vishal R Sahni
(74) *Attorney, Agent, or Firm* — Rankin, Hill & Clark LLP

(57) ABSTRACT

An antivibration device capable of attaining damping performance in a comparatively broad frequency band range is provided. In the antivibration device, between an inner cylinder and an outer cylinder, formed are a first liquid chamber, a second liquid chamber, and a third liquid chamber. There are provided a first orifice passage that makes the first liquid chamber and the second liquid chamber communicate with each other, and a second orifice passage that makes one of the first liquid chamber and the second liquid chamber and the third liquid chamber communicate with each other.

5 Claims, 9 Drawing Sheets

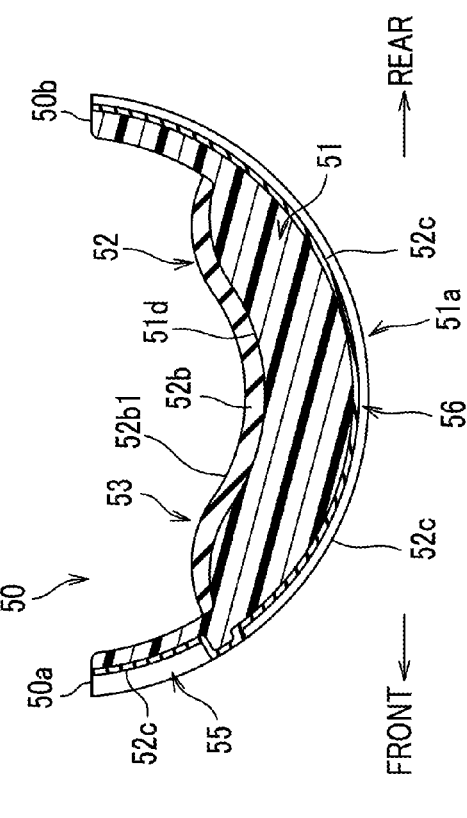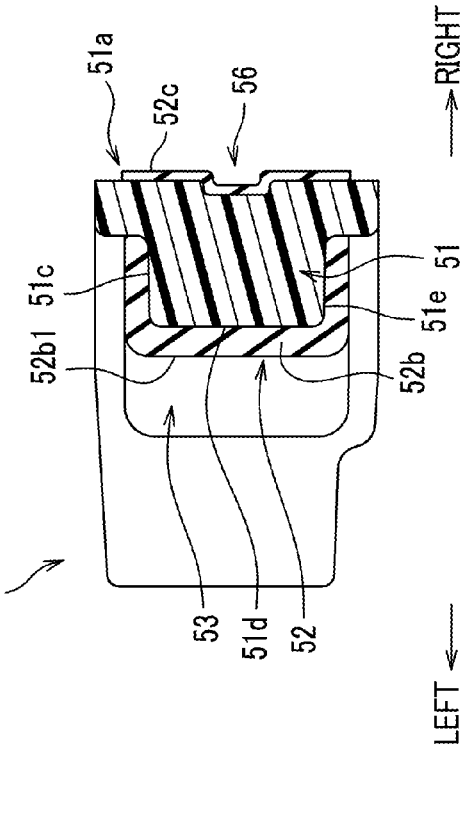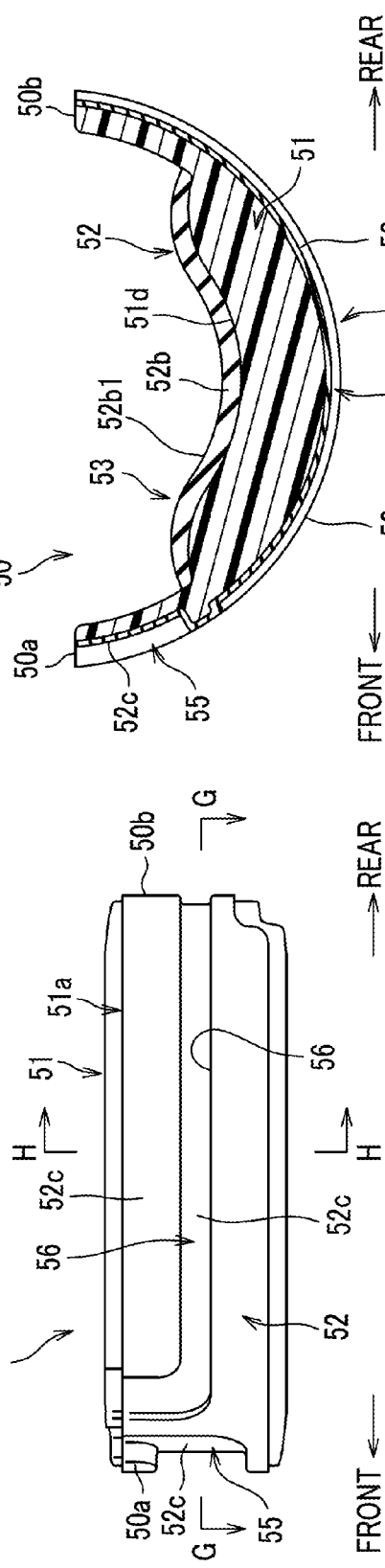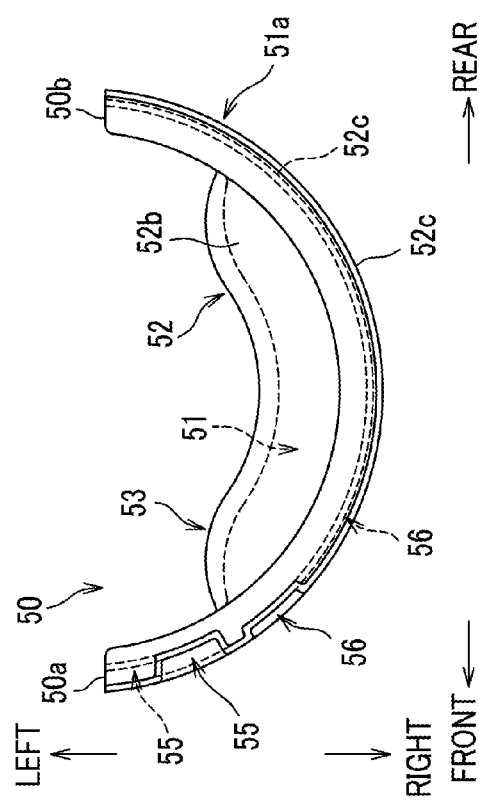

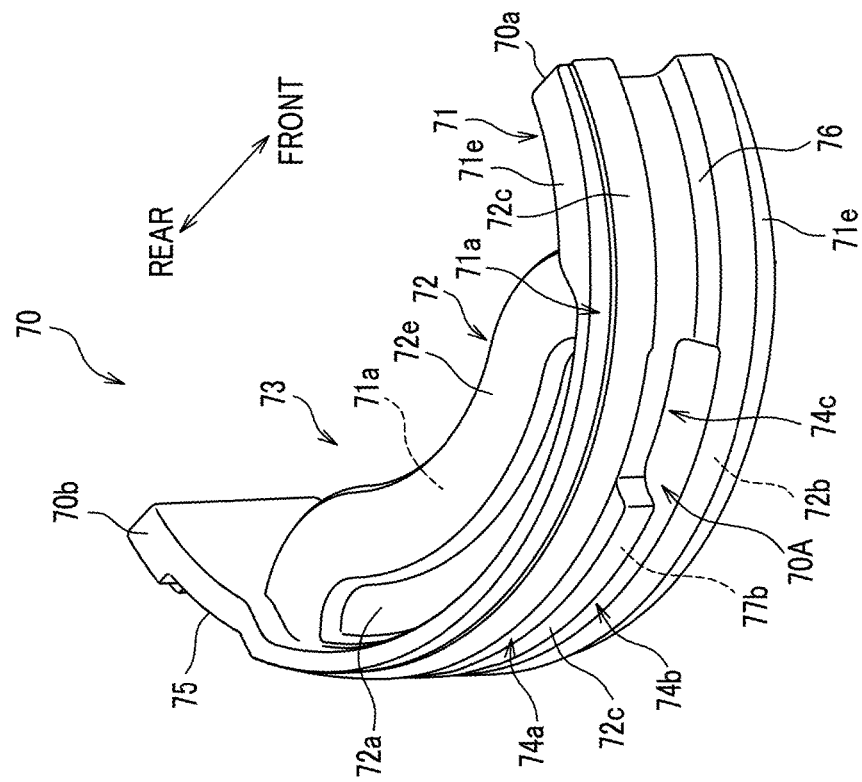
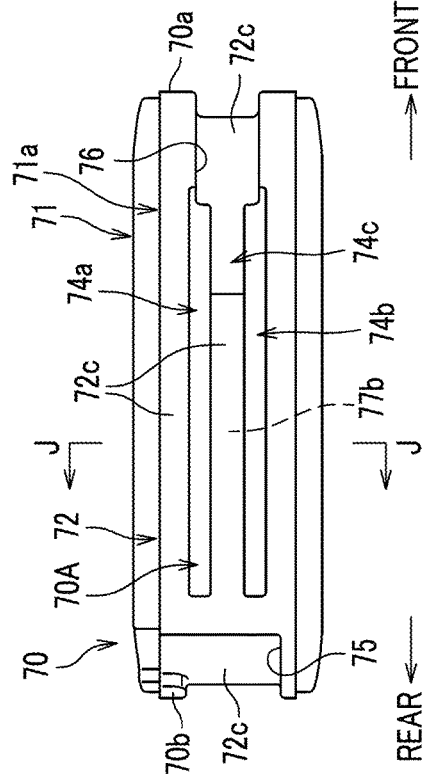
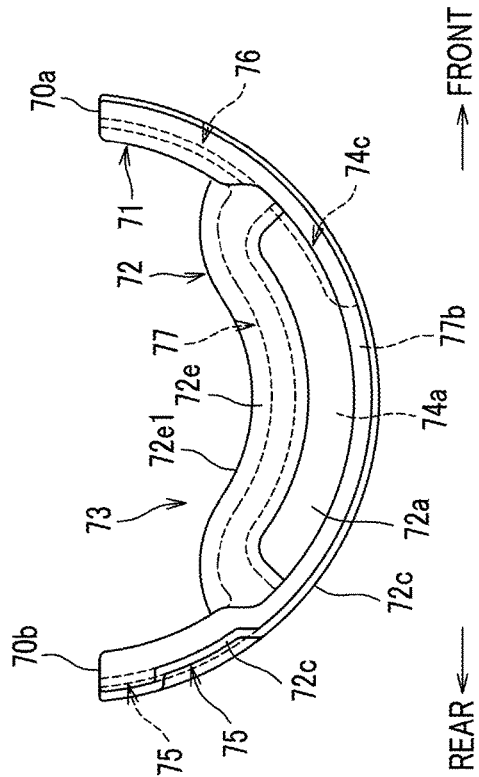

ANTIVIBRATION DEVICE

CROSS REFERENCE TO RELATED APPLICATION

This application claims the priority of Japanese Patent Application No. 2015-244767, filed on Dec. 16, 2015, the entire specification, claims and drawings of which are incorporated herewith by reference.

BACKGROUND OF THE INVENTION

Field of the Invention

The present invention relates to an antivibration device of a liquid charging type.

Description of the Related Arts

An antivibration device used for a vehicle such as an automobile or the like absorbs vibration of a vibrating member such as a suspension, an engine, or the like, by being arranged between the vibrating member and a non-vibrating member such as a vehicle body or the like.

As one of such an antivibration device, an antivibration device includes an outer cylinder, an inner cylinder inserted in the outer cylinder, and an elastic member arranged between the inner cylinder and the outer cylinder, and is provided with a first liquid chamber, a second liquid chamber, and an orifice passage communicating these liquid chambers (for example, refer to Patent Document 1: Japanese Patent Application Publication No. H7-167198).

In such a liquid sealed antivibration device, if an elastic member is elastically deformed by vibration having been input from a vibrating member, operating liquid flows in the orifice passage, liquid column resonance occurs in the orifice passage, and vibration is thereby damped.

SUMMARY OF THE INVENTION

For the above-described antivibration device, by setting the size (length and cross-sectional area) of an orifice passage, desired spring constant and resonance characteristic are obtained. Accordingly, there is a problem that damping performance cannot be attained in a broad frequency band range.

An object of the invention is to provide an antivibration device that solves the above-described problem and can attain damping performance in a comparatively broad frequency band range.

In order to solve the above-described problem, an antivibration device according to the invention includes: an outer cylinder; an inner cylinder inserted in the outer cylinder; and an elastic member arranged between the inner cylinder and the outer cylinder. Herein, between the inner cylinder and the outer cylinder, formed are: a first liquid chamber, a second liquid chamber, and a third liquid chamber; a first orifice passage that makes the first liquid chamber and the second liquid chamber communicate with each other; and a second orifice passenger that makes one of the first liquid chamber and the second liquid chamber, and the third liquid chamber communicate with each other.

As the antivibration device according to the invention includes two kinds of orifice passages, the spring constant of the antivibration device can be easily decreased, and the resonance characteristics can be set, being divided in two steps. Thus, the antivibration device according to the present invention can attain damping performance in a comparatively broad frequency band range. Consequently, it is easy to obtain desired spring characteristics and attain damping performance in a comparatively broad frequency band range.

Incidentally, a vibrating member is a generation source of vibration (for example, a suspension, an engine, etc.)

In the above-described antivibration device, the third liquid chamber may neighbor at least one of the first liquid chamber and the second liquid chamber through an elastic membrane.

If the elastic membrane is deformed by the liquid pressure in the liquid chamber with which the elastic membrane contacts, operating liquid flows, through the second orifice passage, between the third liquid chamber and a liquid chamber communicating with the third liquid chamber. Accordingly, it is easy to obtain desired spring characteristics and attain damping performance in a comparatively broad frequency band range.

The above-described antivibration device may be arranged such that an orifice forming member including the first orifice passage and the second orifice passage is arranged between the inner cylinder and the outer cylinder, and the third liquid chamber is formed on the orifice forming member.

If the third liquid chamber is formed on the orifice forming member, as the space between the inner cylinder and the outer cylinder can be effectively used, the antivibration device can be constructed in a compact size. Further, by the above-described arrangement, as it is possible to integrally form the orifice forming member and the elastic membrane, the manufacturing cost can be reduced.

Further, the above-described antivibration device may be arranged such that the orifice forming member is arranged in a pair of orifice forming members, and the third liquid chamber is formed on each of the orifice members.

If the third liquid chamber is formed in the each of the orifice forming members, the spring constant of the antivibration device can be further easily decreased, and spring characteristics can be easily set.

Still further, the antivibration device may be arranged such that a stopper section for restricting displacement of the inner cylinder is formed between the inner cylinder and the outer cylinder, and the third liquid chamber is formed on the stopper section.

If the third liquid chamber is formed on the stopper section, as the space between the inner cylinder and the outer cylinder can be effectively used, the antivibration device can be constructed in a compact size. Further, by the above-described arrangement, as it is possible to integrally form the orifice forming member and the elastic membrane, the manufacturing cost can be reduced.

According to the invention, it is possible to obtain an antivibration device capable of attaining damping performance in a comparatively broad frequency band range.

BRIEF DESCRIPTION OF THE DRAWINGS

FIGS. 1A and 1B are diagrams showing an antivibration device in a first embodiment according to the invention wherein FIG. 1A shows a front view and FIG. 1B shows a rear view;

FIGS. 5A-5C are diagrams showing one of orifice forming members applied to the same antivibration device, wherein FIG. 5A shows a side view, FIG. 5B shows a plan view related to FIG. 5A, and FIG. 5C shows a cross-sectional view taken along line D-D in FIG. 5A;

FIGS. 6A and 6B are diagrams showing the same one of the orifice forming members, wherein FIG. 6A shows an enlarged cross-sectional view taken along line E-E in FIG. 5A and FIG. 6B shows an enlarged cross-sectional view taken along line F-F in FIG. 5A;

FIGS. 7A-7D are diagrams showing the other one of the orifice forming members applied to the same antivibration device, wherein FIG. 7A shows a side view, FIG. 7B shows a plan view related to FIG. 7A, FIG. 7C shows a cross-sectional view taken along line G-G in FIG. 7A; and FIG. 7D shows an enlarged cross-sectional view taken along line H-H in FIG. 7A;

FIGS. 8A-8C are diagrams showing one of orifice forming members applied to an antivibration device in a second embodiment of the invention, wherein FIG. 8A shows a side view, FIG. 8B is a plan view related to FIG. 8A, and FIG. 8C is a perspective view; and FIGS. 9A and 9B are diagrams showing the same one of the orifice forming members, wherein FIG. 9A shows an enlarged perspective view of a base portion shown by cross-sectional view taken along line J-J in FIG. 8A, and FIG. 9B shows an enlarged perspective view of the orifice forming member shown by a cross-section taken along line J-J in FIG. 8A.

PREFERRED EMBODIMENT OF THE INVENTION

Figure 1A:
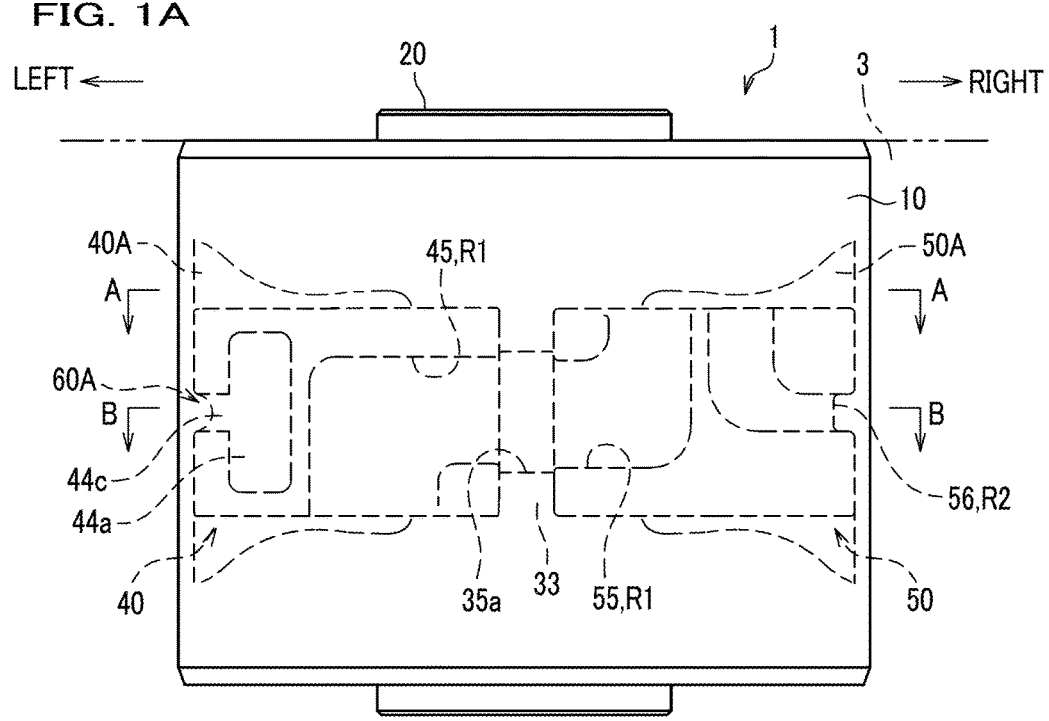
Figure 1B:
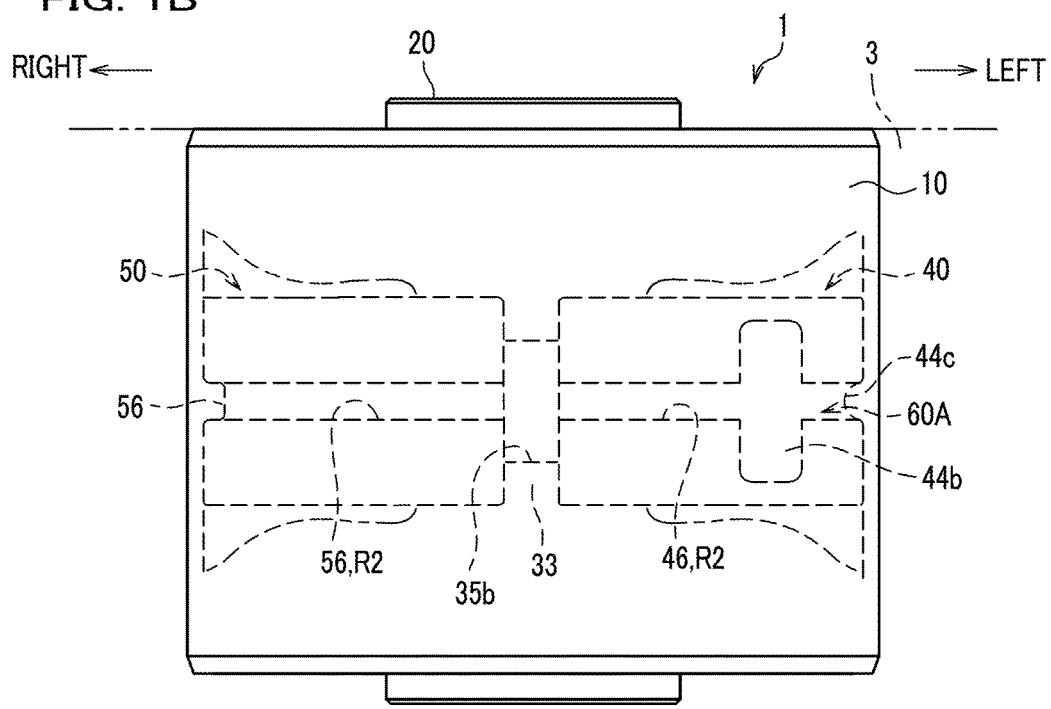

Embodiments according to the invention will be described in detail, referring to the drawings, as appropriate.
First Embodiment An antivibration device 1, in a first embodiment, shown in FIGS. 1A and 1B is arranged between a vibrating member (not shown) constructing a suspension of a vehicle, such as an automobile, and a support member 3 (non-vibrating member) on the vehicle body side.

Incidentally, a non-vibrating member refers to a member (for example, a vehicle body) to which vibration of a vibrating member is not desired to be transferred (for example, a vehicle body).

In the following description, directions front, rear (back), left, and right are set for the convenience of describing the antivibration device 1, and do not limit the structure of the antivibration device 1.

Figure 2:
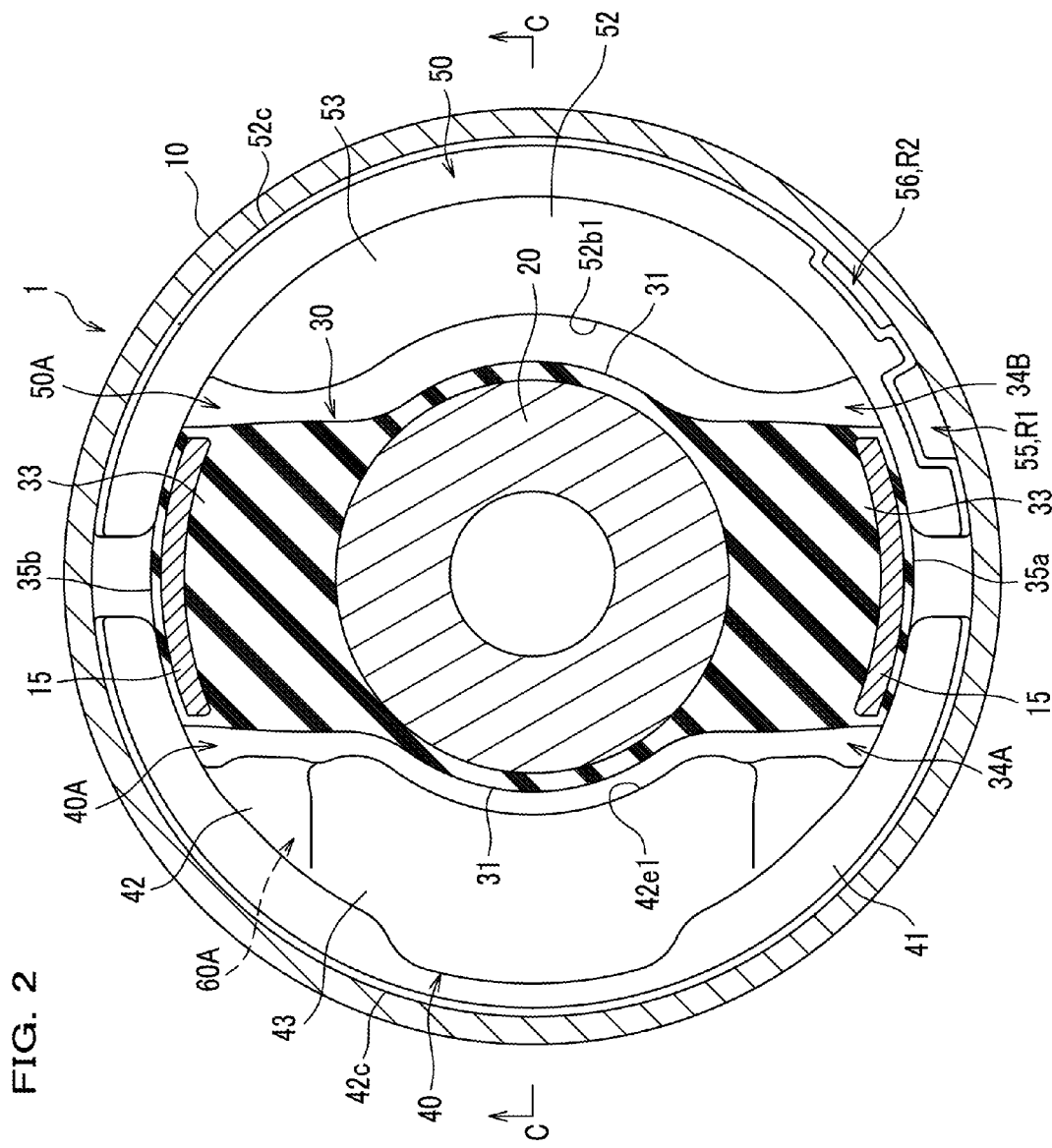
FIG. 2 is a diagram showing the same antivibration device and shows a cross-sectional view taken along line A-A in FIG. 1A.

As shown in FIG. 2, the antivibration device 1 is provided with an outer cylinder 10, an inner cylinder 20 inserted in the outer cylinder 10, an elastic member 30 arranged between the inner cylinder 20 and the outer cylinder 10, a first orifice forming member 40 and a second orifice forming member 50 which are housed between the inner cylinder 20 and the outer cylinder 10.

The first orifice forming member 40 and the second orifice forming member 50 are provided with a first orifice passage R1 and a second orifice passage R2. Further, a first liquid chamber 40A, a second liquid chamber 50A, and a third liquid chamber 60A are formed between the inner cylinder 20 and the outer cylinder 10.

The outer cylinder 10 is a metal cylindrical member. As shown in FIG. 1A, the outer cylinder 10 is fixed to the support member 3 (suspension). Incidentally, the later-described elastic member 30 and the like (see FIG. 2) are pressure fitted into the inner circumferential surface of the outer cylinder 10 and the like, without a seal layer in-between.

As shown in FIG. 2, the inner cylinder 20 is a metal cylindrical member. The inner cylinder 20 is inserted in the central portion of the outer cylinder 10.

The inner cylinder 20 is fixed to the central portion of the vehicle body to be a non-vibrating member (not shown).

As shown in FIG. 2, the elastic member 30 is a rubber member arranged between the outer circumferential surface of the inner cylinder 20 and the inner circumferential surface of the outer cylinder 10.

Figure 3:
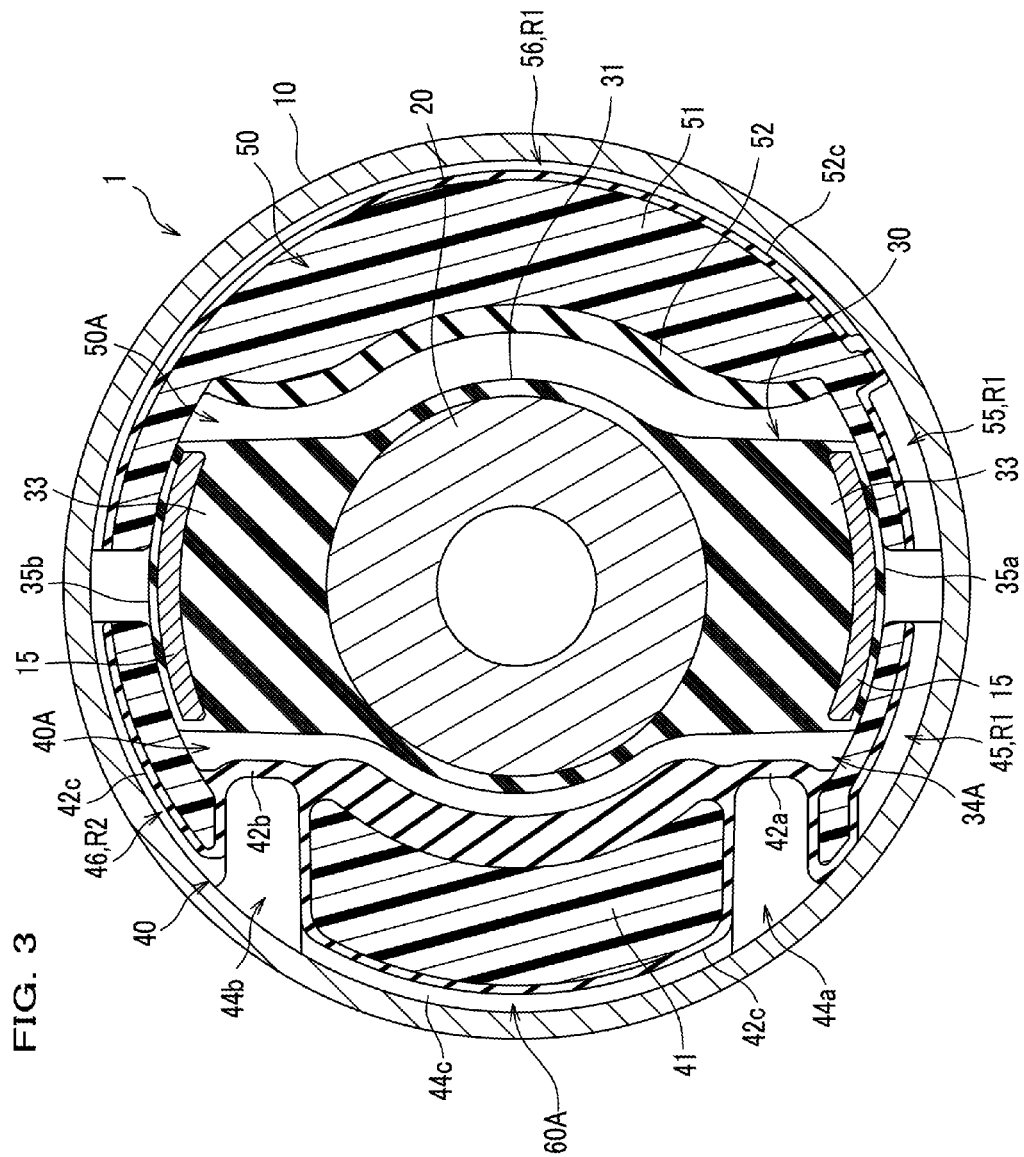
FIG. 3 is a diagram showing the same antivibration device and shows a cross-sectional view taken along line B-B in FIG. 1A.
Figure 4:
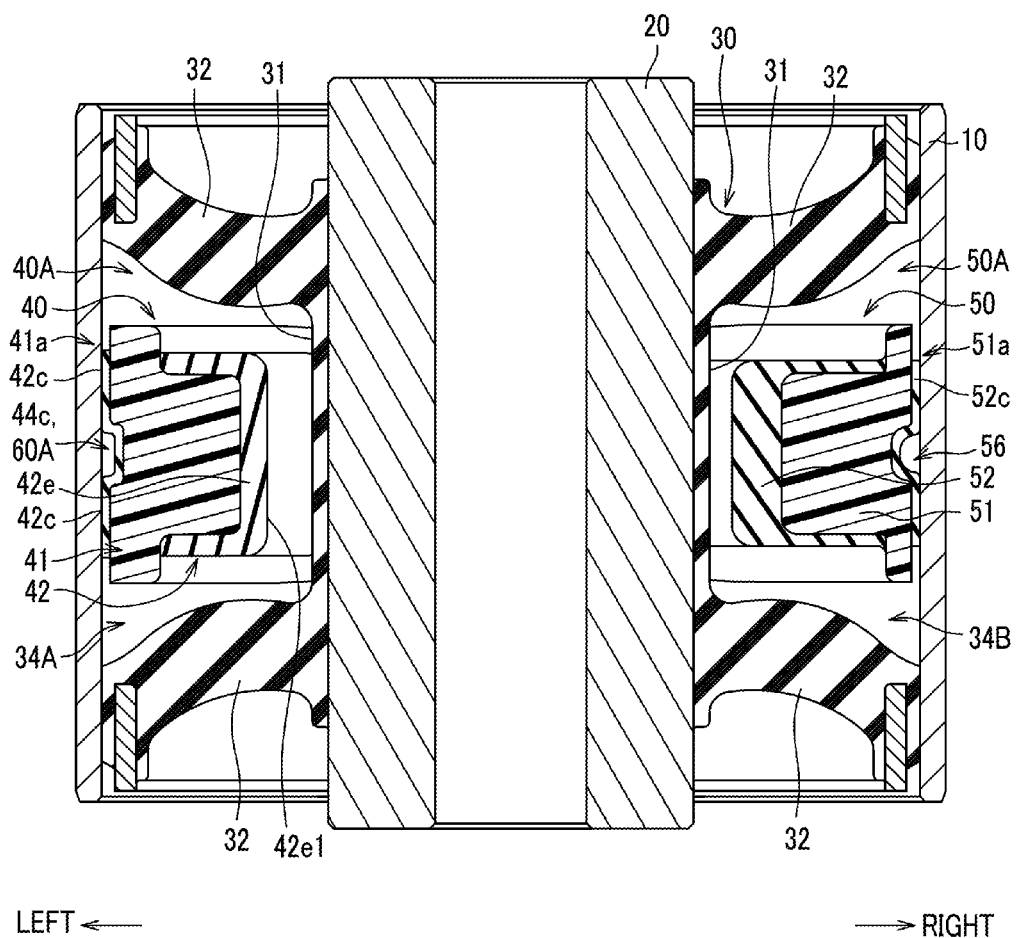
FIG. 4 is a diagram showing the same antivibration device and shows a cross-sectional view taken along line C-C in FIG. 2.

As shown in FIG. 4, the elastic member 30 is provided with a cylindrical portion 31 attached to the inner cylinder 20 by cure adhesion and sidewall portions 32, 32 expanding in the radial direction from the entire circumferences of the upper and lower ends of the cylindrical portion 31. Further, as shown in FIG. 2 and FIG. 3, the elastic member 30 is provided with bulkhead portions 33, 33 expanding, between the upper and lower sidewall portions 32, 32, in the front-rear direction from the cylindrical portion 31.

The inner circumferential surface of the cylindrical portion 31 is, as shown in FIG. 4, attached to the outer circumferential surface of the inner cylinder 20 by cure adhesion. The outer circumferential surfaces of the both sidewall portions 32, 32 and the outer surfaces of the both bulkhead portions 33, 33 (see FIG. 3) are in pressure contact with the inner circumferential surface of the outer cylinder 10. Thus, the inner cylinder 20 and the outer cylinder 10 are elastically connected by the elastic member 30.

Incidentally, as shown in FIG. 1A, the central portion, in the height direction, of the front bulkhead portion 33 is provided with a cutout portion 35a. Thus, a gap is formed between the central portion, in the height direction, of the front bulkhead portion 33 and the inner circumferential surface of the outer cylinder 10 (see FIG. 3).

Further, as shown in FIG. 1B, the central portion, in the height direction, of the rear bulkhead portion 33 is provided with a cutout portion 35b. Thus, a gap is formed between the central portion, in the height direction, of the rear bulkhead portion 33 and the inner circumferential surface of the outer cylinder 10 (see FIG. 3).

As shown in FIG. 4, two tightly closed spaces 34A, 34B are formed between the inner cylinder 20 and the outer cylinder 10. Both the tightly closed spaces 34A, 34B are enclosed by the inner surface of the outer cylinder 10, the cylindrical portion 31, and the upper and lower sidewall portions 32, 32, and are partitioned to the right and left by the bulkhead portions 33, 33 (see FIG. 3). As shown in FIG. 3, the tightly closed spaces 34A, 34B are spaces substantially in a semicircular shape in a plan view. The tightly closed space 34A houses the first orifice forming member 40. The tightly closed space 34B houses the second orifice forming member 50.

Figure 5A:
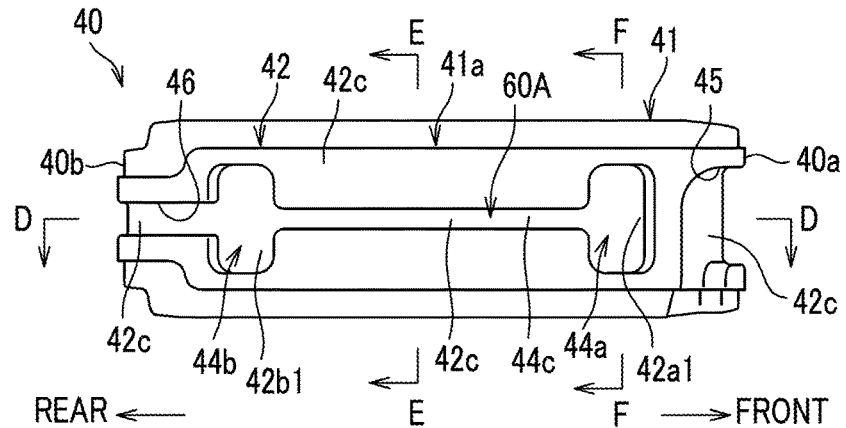

Both the first orifice forming member 40 and the second orifice forming member 50 are members formed substantially in an arc shape in a plan view (see FIG. 2). The first orifice forming member 40 is, as shown in FIG. 5C, provided with a third liquid chamber 60A formed along an outer side surface 41a in an arc shape. The third liquid chamber 60A extends in the circumferential direction along the outer cylinder 10 (see FIG. 3).

As shown in FIG. 5C, the first orifice forming member 40 is provided with a base portion 41 extending in the circumferential direction and made from resin, and a rubber elastic body 42 attached to the base portion 41 by cure adhesion. The intermediate portion 43, in the front-rear direction, of the base portion 41 is expanded inward (on the inner cylinder 20 side, see FIG. 2).

The third liquid chamber 60A of the first orifice forming member 40 is provided with a pair of recessed portions 44a, 44b opening to the front portion and the rear portion of the outer side surface 41a, and a communication passage 44c making the recessed portions 44a, 44b communicate with each other. As shown in FIG. 5A, the recessed portions 44a, 44b are in a longitudinal rectangular shape in a side view and formed such that the length in the height direction is larger than the length along the circumferential direction. As shown in FIG. 5C, the inner space of the recessed portions 44a, 44b are in a rectangular shape longitudinal in the depth direction in a cross-sectional view, and are recessed on the inner cylinder 20 side (see FIG. 3). The recessed portions 44a, 44b are in a shape that is front-rear symmetrical.

As shown in FIG. 5C, the inner surfaces of the recessed portions 44a, 44b are covered by small-thickness portions 42a1, 42b1 of the rubber elastic body 42. The bottom portions of the recessed portions 44a, 44b are closed by the small-thickness portions 42a, 42b of the rubber elastic body 42. That is, the recessed portion 44a neighbors the first liquid chamber 40A with the small-thickness portion 42a in between, and the recessed portion 44b neighbors the first liquid chamber 40A with the small-thickness portion 42b in between. The recessed portions 44a, 44b are elastically deformable and function as membrane portions (elastic membranes). Thus, pressure change in the third liquid chamber 60A and the first liquid chamber 40A is transferred therebetween with each other through the rubber elastic body 42 (small-thickness portions 42a, 42b).

The thicknesses of the small-thickness portions 42a, 42b can be suitable set, corresponding to desired spring characteristics.

Figure 6A:
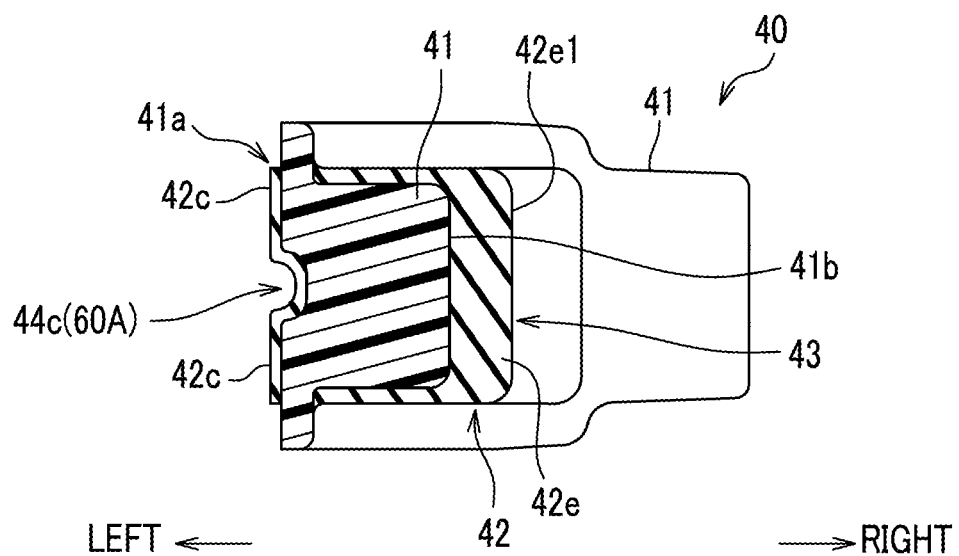
Figure 6B:
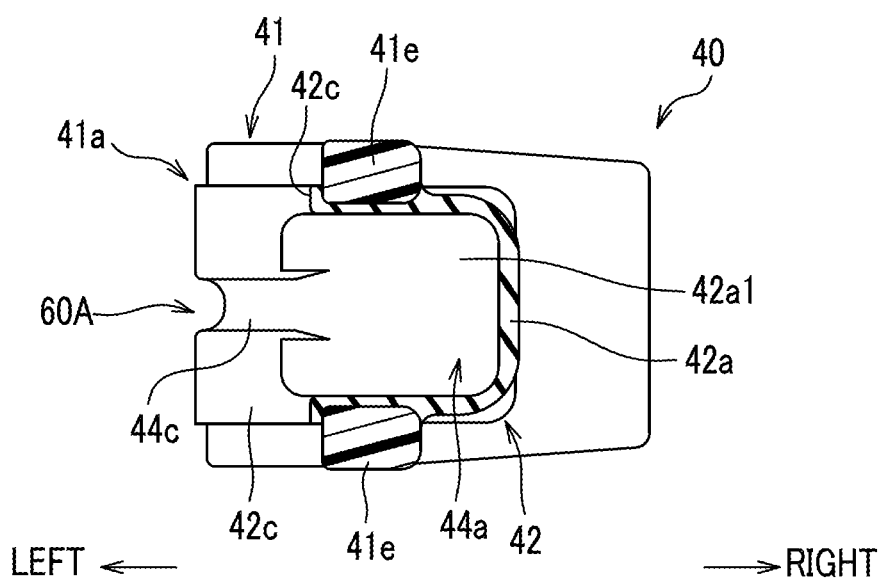

As shown in FIG. 6B, the flange portions 41e, 41e of the base portion 41 are disposed at the upper and lower opening fringe portions of the recessed portion 44a. The respective outer side surfaces 41a of the flange portions 41e, 41e are covered by the small-thickness portion 42c of the rubber elastic body 42. That is, the first orifice forming member 40 is pressure fitted into the outer cylinder 10 through the small-thickness portion 42c. Incidentally, the upper-lower opening fringe portions of the recessed portion 44b are similarly structured.

Figure 5B:
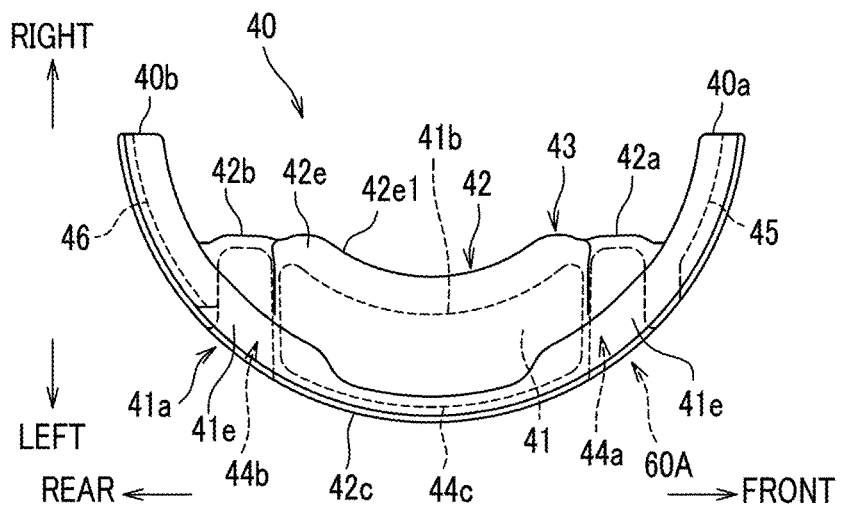
Figure 5C:
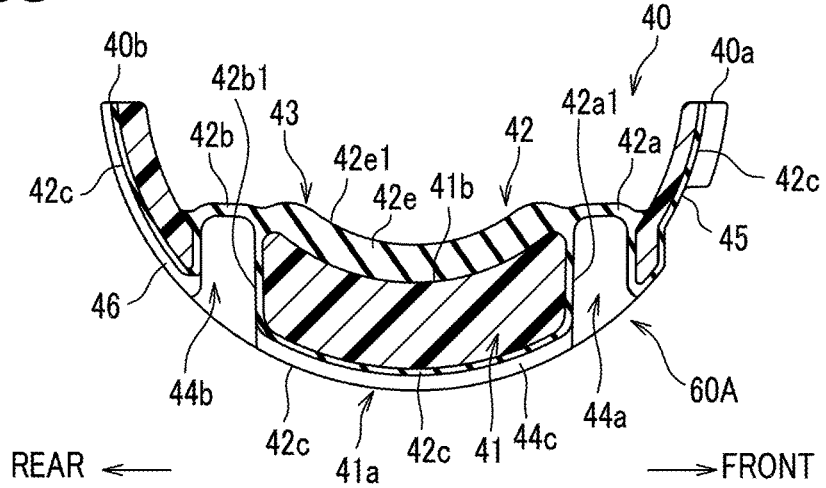

The inner side surface 41b, at the intermediate portion 43, of the base portion 41 is covered by the large-thickness portion 42e of the rubber elastic body 42, as shown by FIGS. 5B, 5C, and 6A. The inner side surface 42e1 of the large-thickness portion 42e is, as shown in FIG. 2, faces the cylindrical portion 31 of the elastic member 30. The inner side portion of the intermediate portion 43 thereby functions as a stopper portion such that if an excessive relative displacement is caused in the radial direction of the elastic member 30, the inner side surface 42e1 of the intermediate portion 43 comes in contact with the cylindrical portion 31 of the elastic member 30 and a shock is thereby reduced.

Incidentally, the recessed portions 44a, 44b are formed by the use of the space at the side of the front portion and the space at the side of the rear portion of the stopper portion (intermediate portion 43) of the first orifice forming member 40. Thus, desired capacities of the recessed portions 44a, 44b are ensured.

A communication passage 44c is, as shown in FIG. 5A, a recessed groove formed along the outer side surface 41a of the base portion 41. The communication passage 44c is formed at the central portion, in the height direction, of the outer side surface 41a and makes communication between the recessed portions 44a, 44b. The communication passage 44c is, as shown in FIGS. 5C and 6A, covered by the small-thickness portion 42c of the rubber elastic body 42.

As shown in FIGS. 5A-5C, on the front portion side of the outer side surface 41a of the base portion 41, a passage 45 is formed to structure the first orifice passage R1. The passage 45 is a recessed groove formed on the outer side surface 41a of the first orifice forming member 40.

The passage 45 is formed at the central portion, in the height direction, of the front end fringe portion 40a of the first orifice forming member 40, extends from the front end fringe portion 40a backward (toward the recessed portion 44a side), and is bent substantially at a right angle toward the end surface of the first orifice forming member 40. The bottom portion of the passage 45 is covered by the small-thickness portion 42c (see FIG. 5C) of the rubber elastic body 42.

On the rear portion side of the outer side surface 41a of the base portion 41, as shown in FIG. 5A-5C, a passage 46 is formed to structure the second orifice passage R2. The passage 46 is a recessed groove formed in a curved shape along the outer side surface 41a of the first orifice forming member 40.

The passage 46 is formed at the central portion, in the height direction, of the outer side surface 41a. The passage 46 is continuous to the recessed portion 44b, and extends from the recessed portion 44b toward the rear end fringe portion 40b of the first orifice forming member 40. The bottom portion of the passage 46 is covered by the small-thickness portion 42c (see FIG. 5C) of the rubber elastic body 42.

The second orifice forming member 50 is, as shown in FIG. 7C, provided with a base portion 51 of resin extending in the circumferential direction, and an elastic body 52 attached to the base portion 51 by cure adhesion. The intermediate portion 53, in the front-rear direction, of the base portion 51 expands inward (the inner cylinder 20 side, see FIG. 2).

As shown in FIG. 7D, the upper surface 51c, the inner side surface 51d, and the lower surface 51e of the intermediate portion 53 are covered by large-thickness portion 52b of the elastic body 52. As shown in FIG. 2, the inner side surface 52b1 of the large-thickness portion 52b faces the cylindrical portion 31 of the elastic member 30. Thus, if an excessive relative displacement is caused in the radial direction of the antivibration device 1, the inner side surface 52b1 of the intermediate portion 53 comes in contact with the cylindrical portion 31 of the elastic member 30, and a shock load is thereby reduced.

As shown in FIGS. 7A-7C, on the front portion side of the outer side surface 51a of the base portion 51, a passage 55 is formed to structure the first orifice passage R1. The passage 55 is a recessed groove formed on the outer side surface 51a of the second orifice forming member 50.

The passage 55 extends backward from the central portion, in the height direction, of the front end fringe portion 50a of the second orifice forming member 50, and is bent substantially at a right angle toward the end surface of the second orifice forming member 50. As shown in FIG. 7C, the bottom portion of the passage 55 is covered by the small-thickness portion 52c of the elastic body 52.

On the outer side surface 51a of the base portion 51 at the intermediate portion 53 and on the rear portion side of the outer side surface 51a, as shown in FIGS. 7A-7C, a passage 56 is formed to structure the second orifice passage R2. The passage 56 is a recessed grove formed on the outer side surface 51a of the second orifice forming member 50 (see FIG. 7C).

As shown in FIG. 7A, the passage 56 extends downwards from the upper end surface of the second orifice forming member 50, and is bent backward substantially at a right angle at the central portion, in the height direction, of the second orifice forming member 50, and extends toward the rear end fringe portion 50b of the second orifice forming member 50. The inside of the recessed portion and the upper and lower opening fringe portions of the passage 56 are covered by the small-thickness portion 52c of the elastic body 52.

The first orifice forming member 40 and the second orifice forming member 50 are, as shown in FIG. 4, disposed substantially at the central portion, in the upper-lower direction, of tightly closed spaces 34A, 34B. The outer side surface 41a of the first orifice forming member 40 is in pressure contact with the inner circumferential surface of the outer cylinder 10 through the small-thickness portion 42c of the rubber elastic body 42. Further, the outer side surface 51a of the second orifice forming member 50 is in pressure contact with the inner circumferential surface of the outer cylinder 10 through the small-thickness portion 52c of the elastic body 52.

Thus, as shown in FIG. 3, the recessed portions 44a, 44b, the communication passage 44c, the first orifice passage R1 and the second orifice passage R2 are respectively in a state of being closed by the inner circumferential surface of the outer cylinder 10. In such a manner, the first orifice forming member 40 is provided with the third liquid chamber 60A, which is a tightly closed space (see FIG. 4). Incompressible operating liquid is charged in the third liquid chamber 60A. As shown in FIG. 3, the recessed portions 44a, 44b of the third liquid chamber 60A are disposed such as to neighbor the first liquid chamber 40A through the rubber elastic body 42 (small-thickness portions 42a, 42b).

Further, as shown in FIG. 4, between the inner cylinder 20 and the outer cylinder 10 and in the periphery of the first orifice forming member 40, the first liquid chamber 40A is formed being enclosed by the outer cylinder 10, the cylindrical portion 31, the upper and lower side wall portions 32, 32, and the first orifice forming member 40.

Further, between the inner cylinder 20 and the outer cylinder 10 and in the periphery of the second orifice forming member 50, the second liquid chamber 50A is formed being enclosed by the outer cylinder 10, the cylindrical portion 31, the upper and lower side wall portions 32, 32, and the second orifice forming member 50.

Incompressible operating liquid is charged in the first liquid chamber 40A and the second liquid chamber 50A. As shown in FIG. 1, the first liquid chamber 40A and the second liquid chamber 50A communicate with each other through the first orifice passage R1 (the passage 45 and the passage 55). That is, arrangement is made such that, in the antivibration device 1, if the displacement of the outer cylinder 10 elastically deforms the elastic member 30 and the liquid pressure in the first liquid chamber 40A or the second liquid chamber 50A thereby changes, the operating liquid flows between the first liquid chamber 40A and the second liquid chamber 50A.

On the other hand, the second liquid chamber 50A and the third liquid chamber 60A, as shown in FIG. 1, communicate with each other through the second orifice passage R2 (the passage 56, the passage 46). That is, arrangement is made such that, in the antivibration device 1, if the displacement of the outer cylinder 10 elastically deforms the elastic member 30, and the liquid pressure in the second liquid chamber 50A or the third liquid chamber 60A thereby changes, the operating liquid flows between the second liquid chamber 50A and the third liquid chamber 60A. Herein, arrangement is made as follows. As the third liquid chamber 60A neighbors the first liquid chamber 40A through the rubber elastic body 42 (the small-thickness portions 42a, 42b), if the liquid pressure in the first liquid chamber 40A or the third liquid chamber third liquid chamber 60A changes, the rubber elastic body 42 (the small-thickness portions 42a, 42b) is thereby deformed so that pressure is transferred between the first liquid chamber 40A and the third liquid chamber 60A.

In the above-described antivibration device 1, as shown in FIG. 1A, vibration having been input from the vibrating member (not shown) to the inner cylinder 20 is absorbed by the elastic deformation of the elastic member 30.

Further, as shown in FIG. 3, in the antivibration device 1, if the elastic member 30 is elastically deformed by the displacement of the outer cylinder 10 due to vibration, the volumes of the first liquid chamber 40A, the second liquid chamber 50A, and the third liquid chamber 60A change, and the liquid pressures in the first liquid chamber 40A, the second liquid chamber 50A, and the third liquid chamber 60A change.

Thus, the operating liquid flows in the first orifice passage R1, liquid column resonance occurs in the first orifice passage R1, and vibration is thereby damped.

Further, the operating liquid flows in the second orifice passage R2, liquid column resonance occurs in the second orifice passage R2, and vibration is thereby damped.

In the antivibration device 1 in the present embodiment, in a range of low frequency of vibration, liquid column resonance in the first orifice passage R1 primarily damps vibration. In the antivibration device 1 in the present embodiment, in a range of high frequency of vibration, liquid column resonance in the second orifice passage R2 primarily damps vibration.

Incidentally, the invention is not limited to the above-described structure, and arrangement may be made such that in a range of lower frequency of vibration, liquid column resonance in the second orifice passage R2 primarily damps vibration, and in a range of high frequency of vibration, liquid column resonance in the first orifice passage R1 primarily damps vibration.

In the above-described antivibration device 1, as shown in FIG. 3, desired spring characteristics can be obtained by setting the sizes of two kinds of orifice passages, which are the first orifice passage R1 and the second orifice passage R2.

As the flow rate of the operating liquid increases when the elastic member 30 is deformed, the spring constant of the antivibration device 1 can be decreased.

Further, by arranging the first orifice passage R1 and the second orifice passage R2 such as to effectively damp vibrations in different frequency ranges, resonance characteristics can be set, being divided into two steps.

Accordingly, in the antivibration device 1, as it is possible to attain damping performance in a comparatively broad frequency band range, vibration having been input from a vibrating member can be effectively absorbed.

Further, as the second liquid chamber 50A and the third liquid chamber 60A communicate with each other through the second orifice passage R2, if the membrane portions (the small-thickness portions 42a, 42b) of the rubber elastic body 42 are elastically deformed by the change in the liquid pressure in the first liquid chamber 40A to which the third liquid chamber 60A neighbors, pressure is transferred to the third liquid chamber 60A so that the operating liquid flows between the third liquid chamber 60A and the second liquid chamber 50A. Accordingly, desired spring characteristics can be easily obtained, and damping performance can be attained in a comparatively broad frequency band range.

Still further, as it is possible to effectively use the space between the inner cylinder 20 and the outer cylinder 10 by forming the third liquid chamber 60A in the first orifice forming member 40, the antivibration device 1 can be structured in a compact size. Further, as the third liquid chamber 60A can be easily formed, compared with an existing antivibration device, excellent productivity is attained. In such a manner, it is possible to obtain an antivibration device 1 that enables improving the functionality while reducing the cost.

Yet further, as the third liquid chamber 60A is formed along the outer side surface 41a of the first orifice forming member 40, the third liquid chamber 60A can be suitably formed, by the effective use of the space on the outer side, in the radial direction, of the first liquid chamber 40A and the space in the circumferential direction, the space being on the inner side of the outer cylinder 10. Accordingly, the capacity of the third liquid chamber 60A can also be easily set, and the degree of freedom of designing the antivibration device 1 increases. Further, as the third liquid chamber 60A (the recessed portions 44a, 44b) is formed by the effective use of the space in the circumferential direction, the space being on the inner side of the outer cylinder 10, it is possible to make the dimension, in the radial direction, of the third liquid chamber 60A can be made comparatively small. Accordingly, it is possible to make the dimension, in the radial direction, of the first orifice forming member 40 small, which accordingly also enables making the dimension, in the radial direction, of the antivibration device 1 small.

Second Embodiment

Figure 9A:
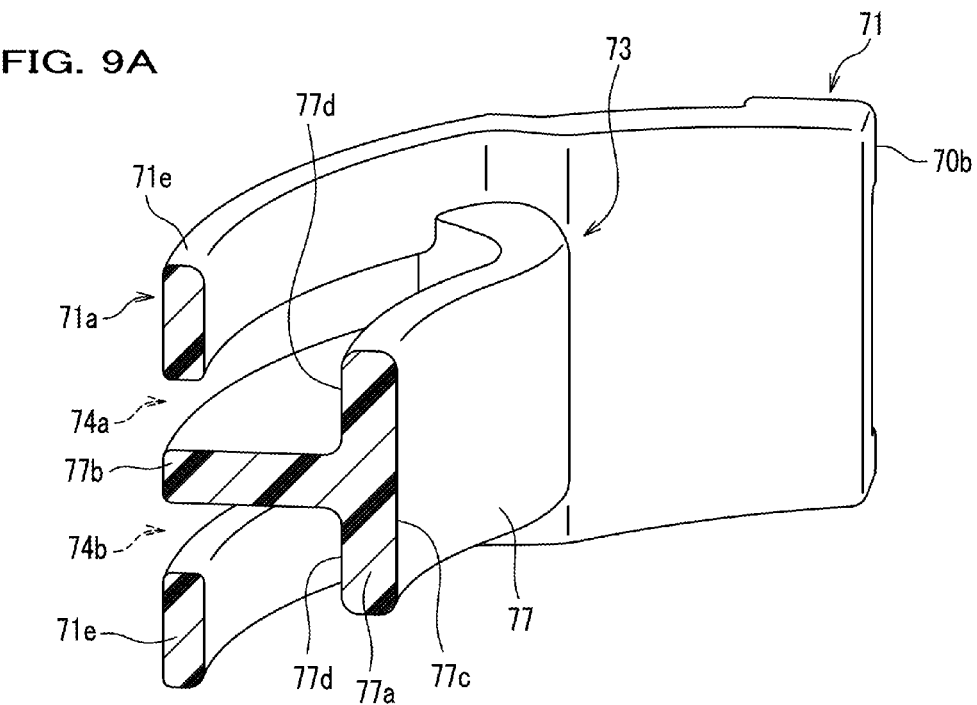
Figure 9B:
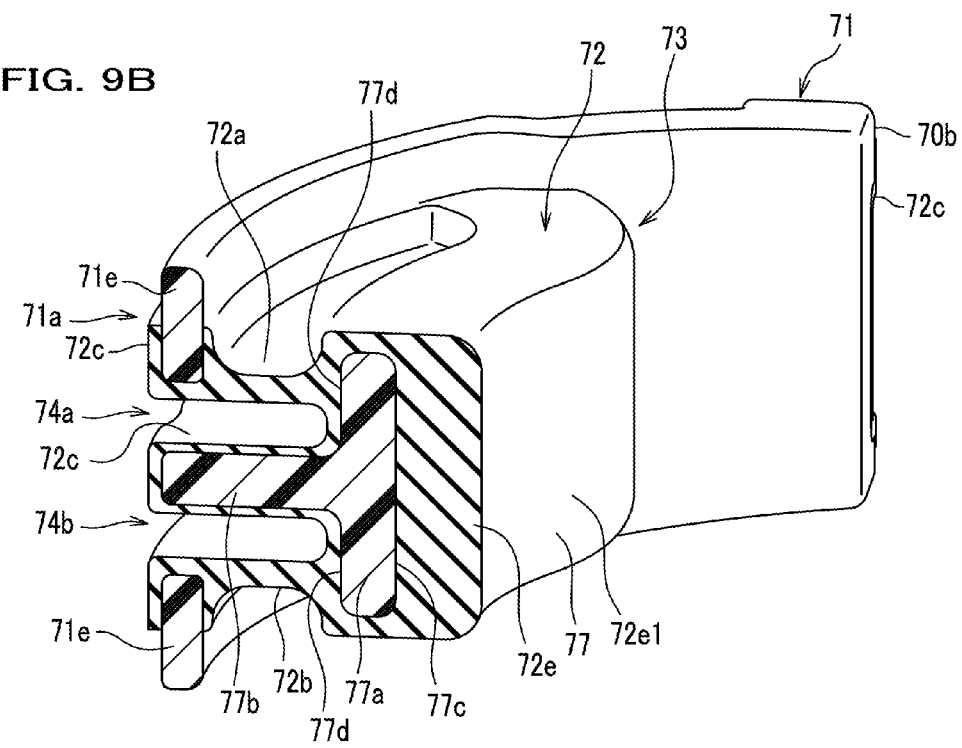

FIGS. 8A-8C are diagrams showing one of orifice forming members applied to an antivibration device in a second embodiment. FIG. 8A is a side view, FIG. 8B is a plan view related to FIG. 8A, and FIG. 8C is a perspective view. FIGS. 9A and 9B are also diagrams showing the same one of orifice forming members, wherein FIG. 9A is an enlarged perspective view of a base portion shown in a cross-section taken along line J-J in FIG. 8A, and FIG. 9B is an enlarged perspective view of the same orifice forming member shown in a cross-section taken along line J-J in FIG. 8A.

As shown in the respective diagrams of FIGS. 8A-8C, a first orifice forming member 70 is provided with a third liquid chamber 70A along an outer side surface 71a.

The first orifice forming member 70 is, as shown in FIGS. 8B and 8C, provided with a base portion 71 of resin extending in the circumferential direction, and a rubber elastic body 72 attached to the base portion 71 by cure adhesion. The intermediate portion 73, in the front-rear direction, of the base portion 71 expands inward (toward the inner cylinder 20, see FIG. 2).

The third liquid chamber 70A is provided with an upper-lower pair of recessed portions 74a, 74b, and a communication passage 74c making the recessed portions 74a, 74b with each other. As shown in FIGS. 8A and 8C, the recessed portions 74a, 74b are formed along the circumferential direction of the outer side surface 71a, and is provided with an opening portion a slit shape extending in the circumferential direction (see FIG. 8A). The recessed portions 74a, 74b are, as shown in FIGS. 9A and 9B, formed by covering a frame portion 77 with the rubber elastic body 72, the frame portion 77 being provided integrally with the base portion 71 to form the intermediate portion 73.

The cross-section of the frame portion 77 is, as shown in FIG. 9A, formed substantially in a T-shape, and is provided with a vertical wall portion 77a and a horizontal wall portion 77b. The vertical wall portion 77a is formed in parallel to the flange portion 71e of the base portion 71. The inner side surface 77c of the vertical wall portion 77a is, as shown in FIG. 9B, covered by a large-thickness portion 72e of the rubber elastic body 72. The inner side surface 72e1 of the large-thickness portion 72e faces the cylindrical portion 31 (see FIG. 2) of the elastic member 30.

As shown in FIG. 9A, the horizontal wall portion 77b protrudes outward (the outer side surface 71a side) from the central portion, in the height direction, of the outer side surface 77d of the vertical wall portion 77a. As shown in FIG. 9B, the horizontal wall portion 77b is covered by the small-thickness portion 72c of the rubber elastic body 72.

The upper portion of the recessed portion 74a on the upper side is closed by the small-thickness portion 72a of the rubber elastic body 72. The lower portion of the recessed portions 74b on the lower side is closed by the small-thickness portion 72b of the rubber elastic body 72. The recessed portions 74a neighbors the first liquid chamber 40A (see FIG. 2) through the small-thickness portion 72a, and the recessed portions 74b neighbors the first liquid chamber 40A through the small-thickness portion 72b. The small-thickness portions 72a, 72b are elastically deformable and function as membrane portions (elastic membranes). Thus, pressure change is transferred between the third liquid chamber 70A and the first liquid chamber 40A mutually through the rubber elastic body 72. Incidentally, the thicknesses of the small-thickness portions 72a, 72b can be suitably set, corresponding to desired spring characteristics.

The communication passage 74c is, as shown in the respective FIGS. 8A-8C, formed by partially cutting off the horizontal wall portion 77b, at the front end portion of the recessed portions 74a, 74b, and makes the recessed portions 74a, 74b communicate with each other. The communication passage 74c is arranged continuously from a passage 76 structuring the second orifice passage R2.

The passage 76 extends toward the front end fringe portion 70a of the first orifice forming member 70.

Incidentally, the rear portion of the first orifice forming member 70 is provided with a passage 75 structuring the first orifice passage R1. The passage 75 extends toward the rear end fringe portion 70b of the first orifice forming member 70. The passages 75, 76 are covered by the small-thickness portion 72c. The positions, the shapes and the like of the passages 75, 76 can be suitably set.

In an antivibration device 1 provided with the above-described first orifice forming member 70, similarly to the first embodiment, if the elastic member 30 is elastically deformed by the displacement of the outer cylinder 10 due to vibration, the volumes of the first liquid chamber 40A, the second liquid chamber 50A (see FIG. 3), and the third liquid chamber 70A change, and the liquid pressures in the first liquid chamber 40A, the second liquid chamber 50A, and the third liquid chamber 70A change.

Thus, the operating liquid flows in the first orifice passage R1, liquid column resonance occurs in the first orifice passage R1, and vibration is thereby damped.

Further, the operating liquid flows in the second orifice passage R2, liquid column resonance occurs in the second orifice passage R2, and vibration is thereby damped.

Further, as the second liquid chamber 50A and the third liquid chamber 70A communicate with each other through the second orifice passage R2, if the membrane portions (the small-thickness portions 72a, 72b) of the rubber elastic body 72 are elastically deformed by change in the liquid pressure in the first liquid chamber 40A, to which the third liquid chamber 70A neighbors, pressure is transferred to the third liquid chamber 70A, and the operating liquid flows between the third liquid chamber 70A and the second liquid chamber 50A. Accordingly, desired spring characteristics can be easily obtained, and damping performance can be attained in a comparatively broad frequency band range.

Further, as it is possible to effectively use the space between the inner cylinder 20 and the outer cylinder 10 by forming the third liquid chamber 70A in the first orifice forming member 70, the antivibration device 1 can be structured in a compact size. Further, as the third liquid chamber 70A can be easily formed, compared with an existing antivibration device, and excellent productivity can be obtained. Accordingly, it is possible to obtain the antivibration device 1 which improves the functionality while enabling reduction in cost.

Further, in the present embodiment, as the third liquid chamber 70A is formed by the effective use of the volume of the intermediate portion 73 and along the outer side surface 71a of the first orifice forming member 70, it is possible to easily set the capacity of the third liquid chamber 70A, and the degree of freedom of designing the antivibration device 1 increases. Still further, as the third liquid chamber 70A (the recessed portions 74a, 74b) is formed by the effective use of the space in the circumferential direction inside the outer cylinder 10, the dimension, in the radial direction, of the third liquid chamber 70A can be made comparatively small. Accordingly, it is possible to make the dimension, in the radial direction, of the first orifice forming member 40 small, which accordingly also enables making the dimension, in the radial direction, of the antivibration device 1 small.

Embodiments according to the invention have been described as above, however, the invention is not limited to the above-described embodiments, and appropriate modifications and changes can be made without departing from the spirit of the invention.

For example, only a passage 58 may be arranged in the second orifice forming member 50 to structure the first orifice passage R1. In this case, compared with the above-described embodiments, the first orifice passage R1 can be formed longer. Thus, the spring characteristics by the first orifice passage R1 can be easily set.

Further, in the first embodiment, the recessed portions 44a, 44b of the third liquid chamber 60A are provided on the front and rear sides of the intermediate portion 43 of the first orifice forming member 40, however, without being limited thereto, the recessed portions 44a, 44b may be arranged being biased to the front side or the rear side of the first orifice forming member 40.

Still further, in the first and second embodiments, the third liquid chamber 60A or the third liquid chamber 70A is formed on the first orifice forming member 40 or the first orifice forming member 70, however, without being limited thereto, the third liquid chamber 60A or the third liquid chamber 70A may be formed on the second orifice forming member 50. In this case, by arranging the third liquid chamber 60A or the third liquid chamber 70A of the second orifice forming member 50, such as to communicate with the first liquid chamber 40A of the first orifice forming member 40, 70 through the second orifice passage R2, operation and effects similar to those in the above-described embodiments can be obtained. Incidentally, the third liquid chamber 60A may be provided both at the first orifice forming member 40 and the second orifice forming member 50, and also, the third liquid chamber 70A may be provided both at the first orifice forming member 70 and the second orifice forming member 50. By such structures, it is possible to set resonance characteristics being divided in three steps.

Yet further, the antivibration device 1 in the present embodiment is arranged between a vibrating member (suspension) and a non-vibrating member (vehicle body), however, a vibrating member and a non-vibrating member, to which an antivibration device according to the invention is applied, are not limited. For example, an antivibration device may be arranged between an engine, which is a vibrating member, and a vehicle body, which is a non-vibrating member.

What is claimed is:

1. An antivibration device, comprising:
   an outer cylinder;
   an inner cylinder inserted in the outer cylinder; and
   an elastic member arranged between the inner cylinder and the outer cylinder,
   wherein, between the inner cylinder and the outer cylinder, formed are:
   a first liquid chamber, a second liquid chamber, and a third liquid chamber;
   a first orifice passage that makes the first liquid chamber and the second liquid chamber communicate with each other; and
   a second orifice passage that makes one of the first liquid chamber and the second liquid chamber, and the third liquid chamber communicate with each other,
   wherein an orifice forming member including the first orifice passage and the second orifice passage is arranged between the inner cylinder and the outer cylinder,
   wherein the orifice forming member includes a first recessed portion provided at a front portion of an outer side surface of the orifice forming member and a second recessed portion provided at a rear portion of the outer side surface of the orifice forming member and a communication passage which communicates the first recessed portion with the second recessed portion,
   and wherein the third liquid chamber is formed of the first and second recessed portions and the communication passage.

2. The antivibration device according to claim 1,
   wherein the third liquid chamber neighbors at least one of the first liquid chamber and the second liquid chamber through a first elastic membrane,
   wherein a bottom portion of the first orifice passage is covered by the first elastic membrane,
   and wherein a bottom portion of the second orifice passage is covered by a second elastic membrane.

3. The antivibration device according to claim 1,
   wherein the third liquid chamber is formed on the orifice forming member.

4. The antivibration device according to claim 3,
   wherein the orifice forming member is arranged in a pair of orifice forming members,
   and wherein the third liquid chamber is formed on each of the orifice members.

5. The antivibration device according to claim 1,
   wherein a stopper section for restricting displacement of the inner cylinder is formed between the inner cylinder and the outer cylinder, and wherein the third liquid chamber is formed on the stopper section.

\* \* \* \* \*